United States Patent [19]
Thomas

[11] Patent Number: 6,028,835
[45] Date of Patent: Feb. 22, 2000

[54] INTEGRATED READ/WRITE HEAD FOR FERROELECTRIC OPTICAL STORAGE

[76] Inventor: Michael E. Thomas, 39224 Guardino Dr. #212, Fremont, Calif. 94538

[21] Appl. No.: 09/185,470

[22] Filed: Nov. 3, 1998

[51] Int. Cl.$^7$ ...................................................... G11B 7/00
[52] U.S. Cl. ......................... 369/121; 369/13; 369/44.37; 369/126; 369/288
[58] Field of Search ................................ 369/58, 13, 110, 369/116, 112, 100, 126, 109, 118, 288, 44.37; 428/64, 65

[56] References Cited

U.S. PATENT DOCUMENTS

| | | |
|---|---|---|
| 4,785,437 | 11/1988 | Dransfeld .................................. 369/13 |
| 4,845,695 | 7/1989 | Yamazaki . |
| 4,855,976 | 8/1989 | Yamazaki . |
| 4,965,784 | 10/1990 | Land et al. . |
| 5,003,528 | 3/1991 | Motes et al. . |
| 5,051,950 | 9/1991 | Evan, Jr. et al. . |
| 5,105,403 | 4/1992 | Kado et al. . |
| 5,105,408 | 4/1992 | Lee et al. . |
| 5,125,750 | 6/1992 | Corle et al. . |
| 5,150,338 | 9/1992 | Birecki et al. . |
| 5,218,584 | 6/1993 | Gfeller . |
| 5,323,372 | 6/1994 | Puech et al. ............................. 369/100 |
| 5,418,029 | 5/1995 | Yamamoto et al. ................. 369/288 X |
| 5,461,600 | 10/1995 | Pohl . |
| 5,598,387 | 1/1997 | Pohl . |
| 5,602,819 | 2/1997 | Inagak et al. . |
| 5,606,541 | 2/1997 | Finkelstein . |
| 5,621,559 | 4/1997 | Thakoor et al. . |
| 5,680,386 | 10/1997 | Carvennec et al. ...................... 369/116 |
| 5,699,175 | 12/1997 | Wilde . |
| 5,822,090 | 10/1998 | Wilde . |
| 5,856,965 | 1/1999 | Tsuchiya et al. ........................ 369/110 |

*Primary Examiner*—Tan Dinh
*Assistant Examiner*—Kim-Kwok Chu

[57] ABSTRACT

An integrated read/write head structure saves and retrieves saved data stored in storage locations on a ferroelectric optical storage medium. A first ultra-violet light emitting diode generates a single beam for exciting the electrons of a ferroelectric molecule of the optical storage medium. An induced electric field transducer orients the ferroelectric molecules potential difference during saving data. A second ultra-violet light emitting diode generates a single beam and a silicon photo diode detects the reflected ultra-violet light from a ferroelectric molecule.

3 Claims, 1 Drawing Sheet

INTEGRATED READ/WRITE HEAD FOR FERROELECTRIC OPTICAL STORAGE

BACKGROUND OF THE INVENTION

Optical disk drives user light and a wide array of objective, polarizing, and newly invented solid immersion lens (SIL). Laser light and photon characteristics have allowed data storage peripherals to store enormous amounts of data. Sometimes the data written could only be written once, on magno-optical drives that data could be rewritten unlimited amount of times by raising the temperature of the entire tract and thereby causing an erasure of data. The latest means for increasing areal densities is done by a multitude of lens arrays finally feeding into a solid immersion lens (SIL). The SIL is a truncated glass sphere which serves to increase the numerical aperture of the optical system by n^2, where n is the index of refraction of the lens material. A focused infrared spot is obtained at the base of the SIL head (manufactured by TeraStor) and, by placing the media within a fraction of a wavelength distance from the SIL head base, this small spot can be transmitted across the small air gap. The high optical efficiency has been utilized to demonstrate the writing and reading at MHZ frequencies.

In contrast, the integrated optical head of the present invention with its newly developed ferroelectric molecule layer is able to produce a much smaller spot then SIL. The extremely high optical efficiency of this unique head will be able to write and read data in the GHZ region and up.

Ferroelectric molecular write activity is influenced by the introduction of ultra-violet or deep blue light according to Einstein/Planck theorem of Quantum Energy. An induced electrical fields alters the ferroelectric molecular materials properties such as conductivity and electrical properties. Removal of the light source and induced electric field leave the ferroelectric molecule in an altered electrical state potential which is non-volatile. A second ultra-violet or deep blue light source and a silicon photo diode are used to detect differences in the diffracted photons of the ultra-violet or deep blue light source being reflected back from the surface of the ferroelectric perovskovite molecule into the photo diode.

OBJECT OF THE INVENTION

It is an object of the present invention to provide improvements in all of the above-mentioned areas, and to produce a system that uniquely out performs data storage in the state of the art as it now exists.

FIELD OF THE INVENTION

In an optical drive device for rewritable recording data by laser diode or laser light source which is integrated semiconductor into the read/write head. A integrated optical read/write head takes advantage of ultra-violet or deep blue light photon recording, increased areal densities of ferroelectric media, low cost, reliability of operation, small size, ease of manufacturability, and extremely high data transfer rates and storage capacity requirements of tomorrow's data storage devices which will be used for music, medical, video, telecommunications, and computer information storage.

This invention relates to a novel integrated semiconductor ferroelectric read/write head using a ultra-violet or deep blue light source with a silicon photo diode for reading data and a deep blue or ultra-violet light source write head device, and more particular, to a head device that writes and reads to a novel ferroelectric perovskovite optical storage medium. Writing is done with ultra-violet or deep blue light and an applied electric field output to change the positive or negative polarization potential difference of a ferroelectric molecule in the media coating on a metal, glass or plastic type substrate for use in a rotating or linear read/write peripheral device for storing audio, video or digital information. The peripheral device uses a ultra-violet or deep blue light source with an applied electric field orientation transducer for writing. Reading is done by a second deep blue or ultra-violet light source that is reflected off of the ferroelectric perovskovite molecule surface to a silicon photo diode that is able to detect small changes in the diffraction of the ultra-violet or deep blue light on the ferroelectric perovskovite molecule. When the applied field along with the ultra-violet or deep blue light source output causes the internal dipoles of the ferroelectric perovskovite molecule to orientate in the opposite direction of the applied field which can be made to store random electric field potential differences (analog voltages). The stored electric field difference (voltage) of the ferroelectric molecule is permanently changed until ultra-violet or deep blue light and the applied field are tuned on again to reorientate the direction of the potential difference. The dipoles electrical polarity of the ferroelectric molecule physically changes the transmiscivity, opacity, diffraction, and reflection characteristics of ultra-violet or deep blue light on the ferroelectric molecule. Extremely small laser spots of 300 angstroms and less can be written and read using integrated optical head structure with densities of 40 gbits/sg. and up being realized.

BRIEF DESCRIPTION OF THE DRAWINGS

The accompanying drawings, which are incorporated in and form a part of the specification, illustrate an embodiment of the invention and, together with the description, serve to explain the principles of the invention. In the drawings.

DETAILED DESCRIPTION OF THE PRESENTLY PREFERRED EMBODIMENT

Figure 1:
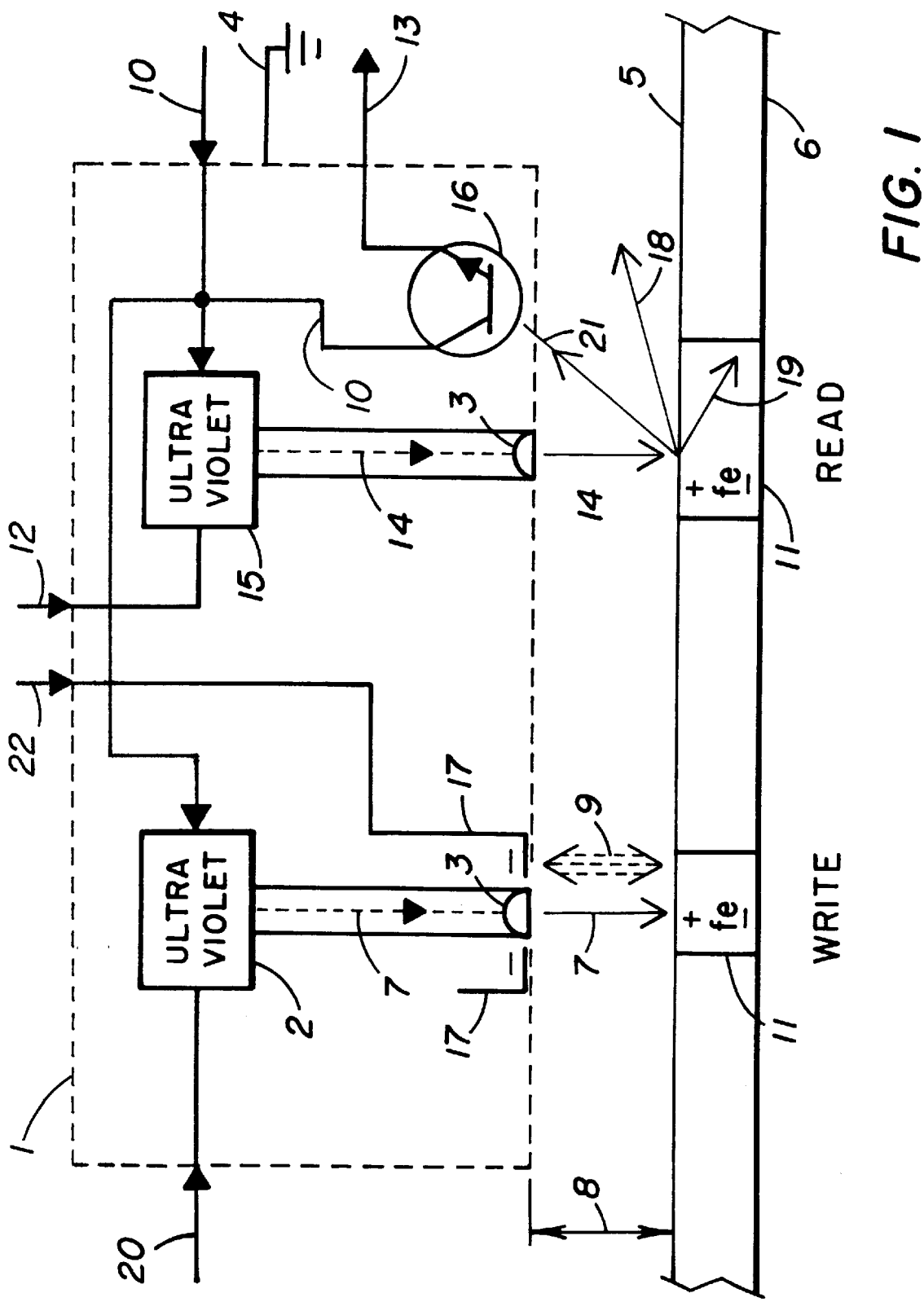
FIG. 1 is an overall block diagram of an exemplary Integrated Ultra-Violet or Deep Blue Read/Write Head for Ferroelectric Media in accordance with the present invention.

FIG. 1 is a overall block diagram of a presently preferred exemplary embodiment of a Integrated Ultra-Violet or Deep Blue Read/Write Head drive in accordance with the present invention. Referring to FIG. 1, includes write ultra-violet or deep blue diode 2, objective lens 3, flying head 1, ferroelectric surface recording medium 5, plastic substrate 6, write ultra-violet or deep blue light output 7, flying head 1 to medium 5 flying height spacing 8, electrical field transducer 17, electrical field 9, silicon photo diode 16, ferroelectric perovskovite molecule 11, read gate 12, read ultra-violet or deep blue diode 15, read data out 13, read ultra-violet light output 14, reflected ultra-violet or deep blue light 21, reflected ultra-violet or deep blue light 18, diffracted ultra-violet or deep blue light 19, write gate 20, write data 22, positive and negative voltage inputs 10, and ground 4.

Depending on the crystal structure, in some crystal lattices, the centers of the positive and negative charges do not coincide even without the application of an external electric field. In this case, it is said that there exists spontaneous polarization in the crystal. When the polarization of the molecule can he altered by an electric field, it is called ferroelectric. Read gate 12 enables read ultra-violet or deep blue diode to emit ultra-violet or deep blue light 14. Data is read 13 from the ferroelectric molecule 11 by the read silicon photo diode 16, reflected ultra-violet or deep blue light 21 has a high angle of reflection when the ferroelectric molecule 11 has a positive voltage potential with little deffracted light 19, in contrast, reflected ultra-violet or deep blue light 18 has a low angle of reflection when the ferroelectric molecule has a negative potential with a large amount of diffracted light 19. The reflected light 21 can be made to represent data equal to binary one at the output of diode 16 data 13, and reflected light 18 which never strikes silicon photo diode 16 can represent a binary 0 at the output of silicon photo diode 16 at data out 13. Write gate signal 20 turns on write ultra-violet diode 2. Write data signal 22 controls the polarity of electric field transducer 17 which generates a negative or positive electrical field 9 used to polarize the ferroelectric perovskovite molecule 11. Ultra-violet or deep blue light 7 generates free electrons in the ferroelectric molecule due to the Einstein/Planck Quantum Theory which are used by the electric field 9 of transducer 17 to induce electron movement, i.e. electric current, in the ferroelectric perovskovite crystal. The electrical field 9 polarity potential will remain with the ferroelectric molecule after write ultra-violet or deep blue light 2 and transducer 17 are turned off. Objective lens 3 is used to refine the ultra-violet or deep blue light 7. Non-contact distance 8 separates flying head 1 from ferroelectric medium 5 and substrate 6.

Although only a few presently preferred exemplary embodiments have been discussed in detail above, those of ordinary skill in the art will certainly realize that may modifications are possible without departing from the scope and spirit of the present invention as defined in the following.

What I claim is:

1. An integrated read/write head structure for saving and retrieving saved data stored in storage locations on a ferroelectric optical storage medium comprising:

a first ultra-violet or deep blue light emitting diode for generating a single beam for exciting the electrons of a ferroelectric molecule of said optical storage medium, an induced electric field transducer for orientating the ferroelectric molecules potential difference during saving data, a second ultra-violet or deep blue light emitting diode for generating a single beam and a silicon photo diode for detecting reflected ultraviolet or deep blue light from a ferroelectric molecule.

2. An integrated read/write head structure of claim 1, wherein said ultra-violet or deep blue light emitting diodes, electric field transducer, and silicon photo diode are integrated on a common semiconductor structure.

3. The integrated read/write head structure of claim 1, wherein said read/write head is used in a rotating disk or linear storage device.

* * * * *